(12) United States Patent
Allen et al.

(10) Patent No.: US 6,256,478 B1
(45) Date of Patent: Jul. 3, 2001

(54) DYNAMIC PACKET SIZING IN AN RF COMMUNICATIONS SYSTEM

(75) Inventors: James D. Allen, Rochester; Grant B. Carlson, Pittsford; Allen D. Heberling, Penfield, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/506,136

(22) Filed: Feb. 17, 2000

Related U.S. Application Data

(60) Provisional application No. 60/120,613, filed on Feb. 18, 1999.

(51) Int. Cl.[7] .................................................... H04Q 7/20

(52) U.S. Cl. ..................... 455/63; 455/67.1; 455/67.5; 455/466

(58) Field of Search ........................ 455/63, 67.1, 67.3, 455/67.4, 67.5, 67.6, 218, 222, 223, 224, 226.1, 295, 296, 298, 299, 450, 466; 370/528, 343, 450; 375/356, 357

(56) References Cited

U.S. PATENT DOCUMENTS

| 5,574,979 | | 11/1996 | West . | |
| 5,768,687 | * | 6/1998 | Marzoug | 455/63 |
| 5,802,060 | * | 9/1998 | Fischbach et al. | 370/450 |
| 5,828,293 | * | 10/1998 | Rickard | 455/63 |
| 6,006,071 | * | 12/1999 | Roberts et al. | 455/63 |
| 6,009,332 | * | 12/1999 | Haartsen | 455/450 |
| 6,072,784 | * | 6/2000 | Agrawal et al. | 370/343 |

* cited by examiner

Primary Examiner—Nay Maung
(74) Attorney, Agent, or Firm—Thomas H. Close

(57) ABSTRACT

A wireless communication system operating in the presence of the periodic noise such as from a microwave oven, the communication system, wherein the wireless communication system including at least two wireless communication stations with transceiver in microwave communication with each other, each such station detects periodic microwave signals for producing a signal indicating the duration of a periodic microwave signal's quiescent period; and controls the transmitter to send a data packet which includes data and the duration of quiescent periods in the periodic microwave signal; and adjusts the amount of data sent in an data packet as a function of the duration of the quiescent period.

3 Claims, 6 Drawing Sheets

DYNAMIC PACKET SIZING IN AN RF COMMUNICATIONS SYSTEM

CROSS REFERENCE TO RELATED APPLICATIONS:

This application claims the priority of U.S. Provisional Patent Application Ser. No. 60/120,613 filed Feb. 18, 1999, by Allen et al., entitled "Dynamic Packet Sizing in an RF Communications System."

FIELD OF THE INVENTION

This invention relates to a digital wireless wideband RF communication system operating in periodic noise environments. Such a system is useful, for example, for communicating digital data at high data rates; e.g. rates greater than 1 Mega bits per second (Mbps).

BACKGROUND OF THE INVENTION

With the advent of digital photography, the wireless transmission of digital images, for example between a portable transmitting device like a digital camera and a receiving device such as a personal computer or other image appliance such as a printer, has become a desirable feature. High data rate transmissions are desirable because digital images represent a large amount of data and short transmission times are needed. Short transmission times result in shorter wait times while an image is being transferred from a camera to a receiver and in reduced battery power consumption.

Although there are several useful communication bands available for such a digital communication system, the 2.4 to 2.5 GHz ISM Band is particularly attractive because the band is unlicensed and available internationally. However, a major problem exists with the use of this band for wireless communication. The band is allocated for microwave ovens and other devices, which as described below, generate a great deal of periodic noise in the band. Other communication bands like the 5.75 GHz band can also have periodic noise generators present. For the purpose of describing the present invention, references will only be made to periodic microwave noise as is present in the 2.4 to 2.5 GHz ISM band. It will be understood that the same principles can be used in the presence of any other kind of periodic noise in any communication band.

Radio frequency (RF) transmissions in the 2.4 to 2.5 GHz ISM Band have historically had to deal with the presence of man-made noise from microwave ovens that predominately operate in the center of this band at 2.45 GHz. The noise emanates from the oven by leakage through the enclosure of the oven. The leakage noise is periodic and has a radiated output power approximately 20 dB greater in strength than that allowed by the FCC for operation of Part 15 non spread spectrum radios. With over 200 million microwave ovens in use throughout the world, they are by far the greatest and most significant source of noise in this band. In addition microwave lighting and illumination systems are soon to be in use in the same band creating additional noise interference. Some examples of locations where it would be desirable to transmit images in the presence of periodic microwave noise are in the home (particularly in the kitchen), or in a supermarket or department store where a photo kiosk may be located near a microwave oven or lighting system.

One possible way to communicate in the presence of microwave noise is to use a spread spectrum communication technique. One type of spread spectrum technique spreads the signal over a band which is much larger than the bandwidth of the signal so that the narrow band noise from the noise source has a reduced effect on the demodulated signal to noise ratio. This technique however is relatively expensive to implement, significantly limits the data throughput (e.g. by a factor of 8 or more) and does not work well if the receiver is located very close to the noise source. Another way to communicate in the presence of microwave noise is described in U.S. Pat. No. 5,574,979, issued Nov. 12, 1996 to West, entitled "Periodic Interference Avoidance in a Wireless Radio Frequency Communication System". This patent demonstrates a potential solution by avoiding microwave oven periodic noise by sensing the periodicity of the AC power line main in which the oven is connected to. Unfortunately this technique does not work for periodic noise sources other than microwave ovens or in cases where multiple microwave noise sources on different phases exist. This technique also does not work in cases where the RF communication equipment is battery powered and no connection to an AC power main can be made, nor can the AC main E field radiation be received by the RF communication equipment. Furthermore this approach does not address the problem where one of the wireless communication stations can sense the noise, but the other wireless communication station cannot; when both stations are subjected to noise having different characteristics; or when three or more stations are trying to communicate and one or more are in a noise environment.

There is a need therefore for an improved means of digital communication in environments with periodic noise.

SUMMARY OF THE INVENTION

It is an object of the present invention to provide for an improved means of efficient digital communication in the presence of periodic noise.

This object is achieved in a wireless communication system operating in the presence of the periodic noise such as from a microwave oven, the communication system, comprising: the wireless communication system including at least two wireless communication stations with transceiver in microwave communication with each other, each such station including: i) means for detecting periodic microwave signals for producing a signal indicating the duration of a periodic microwave signal's quiescent period; ii) means for controlling the transmitter to send an data packet which includes data and the duration of quiescent periods in the periodic microwave signal; and iii) means for adjusting the amount of data sent in an data packet as a function of the duration of the quiescent period.

The present invention provides a means to detect the presence of periodic microwave energy and controls the communications of data during quiescent periods of the periodic energy signal. In a digital radio system, the data is formatted into data packets. Data packets are transmitted until the quiescent period ends. This invention uses the knowledge of the quiescent period's starting time and duration to dynamically change the length of a data packet. In this way, all of the available quiescent time is used to transport data and the data throughput is maximized.

The advantages of the present invention is the ability to use information about the quiescent period to maximize data communications throughput by changing the size of the data payload in the data packet and making it fit into the allowed time period.

DETAILED DESCRIPTION OF THE INVENTION

Figure 1:
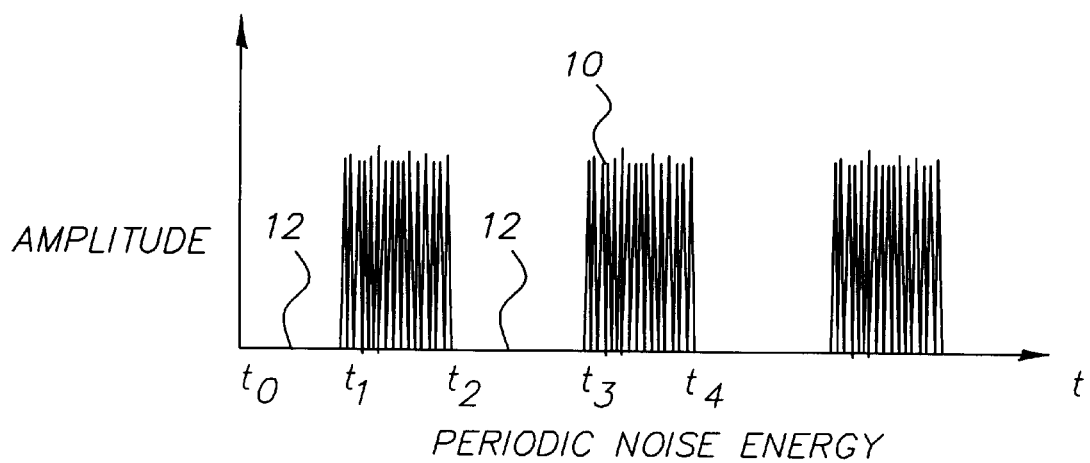
FIG. 1 is a plot of periodic microwave energy.
Figure 2:
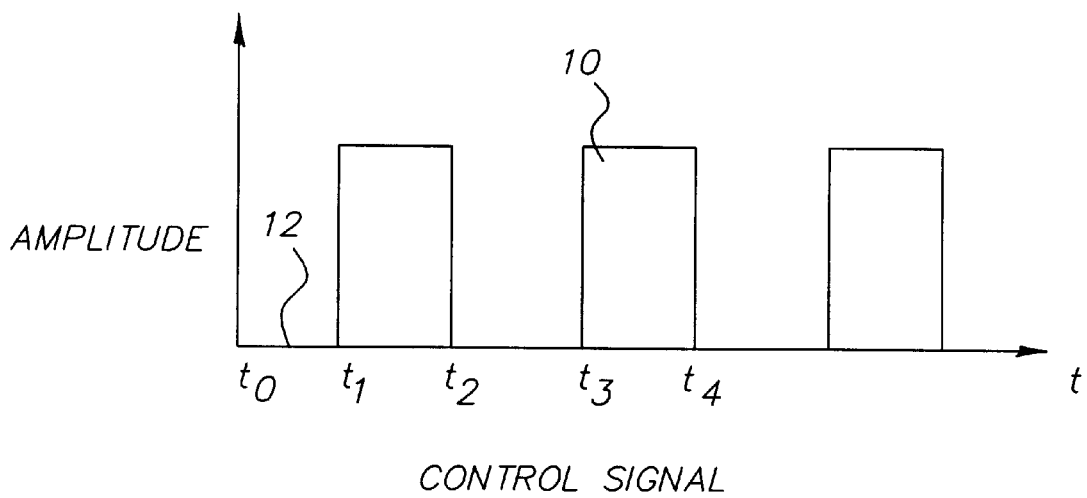
FIG. 2 is a plot of the control signal generated by circuitry in response to the periodic microwave energy.

In addressing the above problem, it is understood that the noise produced by a periodic microwave energy source can interfere with and disrupt communications between two stations. FIG. 1 shows the energy radiated from a microwave oven 10 which is periodic to the AC line frequency. Previous art shows how periodic microwave energy can be detected and how information about the signals quiescent period 12 can be captured. In the preferred embodiment of the system, the transmitter detects the presence of the periodic microwave energy signal and copies that signal into a signal generator. That generator (not shown) produces the signal in FIG. 2 which tells the system when and how long the quiescent periods are. At time $t_0$, $t_2$, $t_{2n}$ (for all integers n=0 to the end of the signal), a Start of Quiescent Period data packet is transmitted and contains a header and data sections. A packet becomes a Start of Quiescent Period packet when the type 36 is encoded as a SOQP type and the data contains the duration data.

Figure 3:
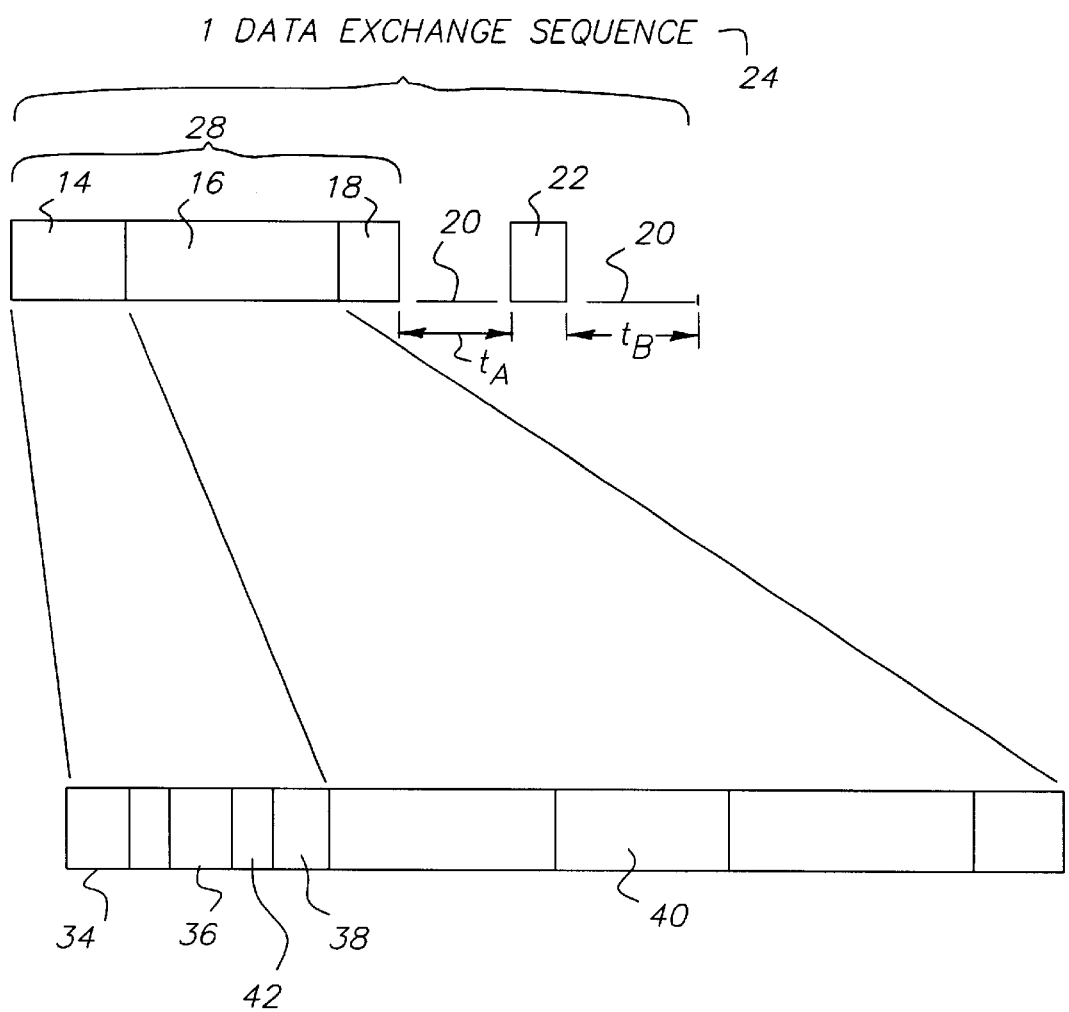
FIG. 3 is a diagram of a data packet exchange.

FIG. 3 shows the packet sections typical of the IEEE 802.11 communications protocol. The header 14 contains data about the data packet, the data, including the start bits 34, packet type 36, length of the data section 42, and a header check sum 38. The data section 16 contains the length of the quiescent period ($t_1-t_0$, $t_3-t_2$) 40 and may also contain other data. The Frame Check Sequence (FCS) 18 is used to check the integrity of the entire packet (called a frame). After the data packet is transmitted, an inter-frame period 20 is allowed for the message to be processed and to allow the transceivers to switch from transmit to receive or visa versa. The acknowledgment (ACK) 22 or a NACK is sent back. Another delay 20 is allowed for the transceivers to revert to the first state, and the next data packet can be transmitted when it is ready. This entire cycle is called a data exchange 24.

Figure 4:
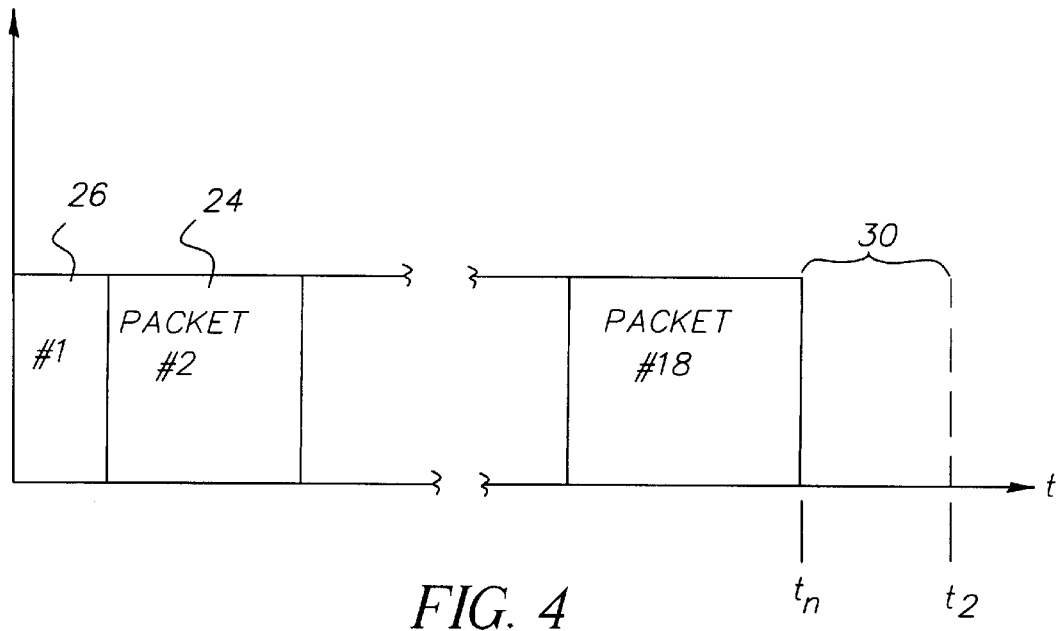
FIG. 4 is a diagram of an integer number of data packet exchanges showing how quiescent time shorter than a integer number of data packets is unused.

In FIG. 4, the number of data packets that can be transmitted within the quiescent period is the period, $t_2$ divided by the sum of the exchange sequence for each type of data packet to be sent. If the SOQP data packet is the first data packet sent 26, and the data packet exchange sequences 24 follow, it is likely that some amount of time, $t_2-t_n$ 30 will exist at the end of the sequence of data packets which is smaller than the data packet to be sent. The size of these data packets is optimized for the noise characteristics of the air channel. Larger data payloads are more efficient because they are proportionally larger than the data packet overhead (that is, the non data bits). However, the larger the data packet, the higher the probability that a noise signal will cause it to be incorrectly detected and require it to be retransmitted. Therefore, the preferred size of the data packets is set by the system's capabilities and the amount of channel noise. If packets have to change size, the preferred method is to make data packets smaller rather than larger than the optimal size.

Figure 5:
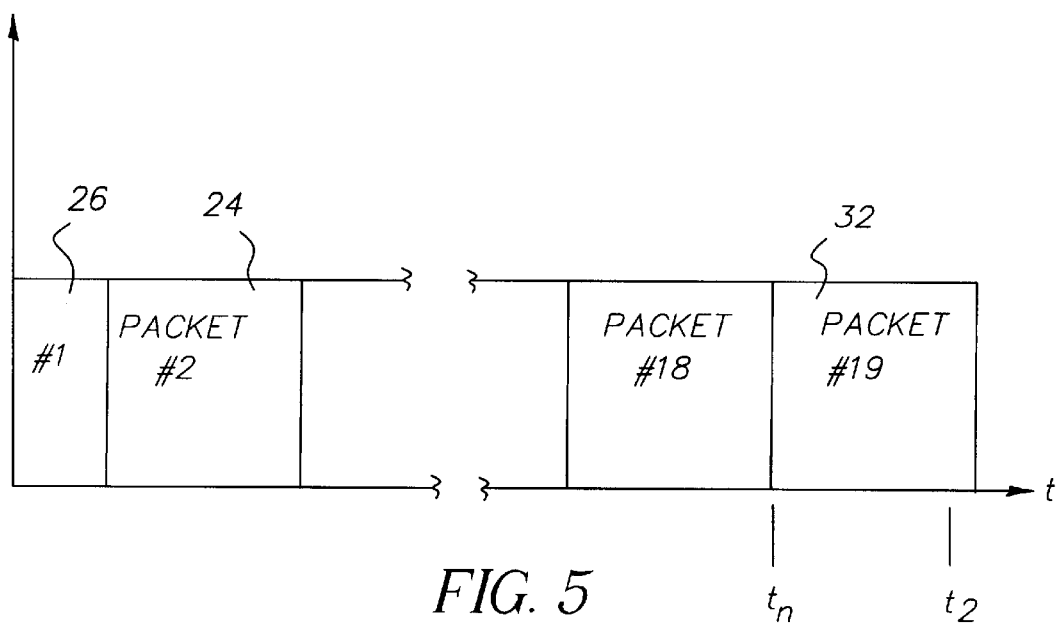
FIG. 5 is a diagram showing how variable width data packets completely fill the allowed quiescent period.
Figure 6:
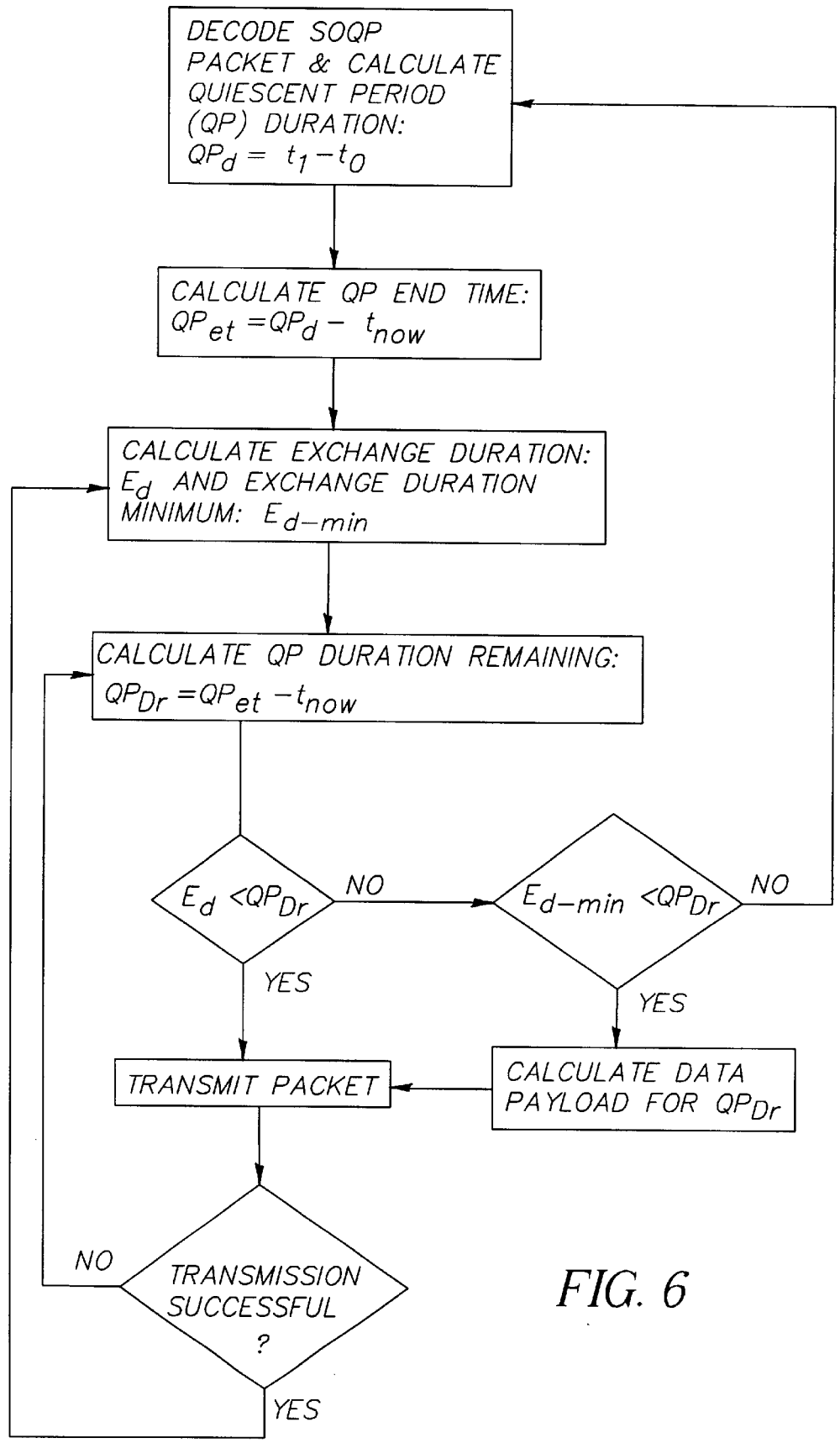
FIG. 6 is a logical flow chart showing a method of creating the variable length data packet.
Figures 7A, 7B:
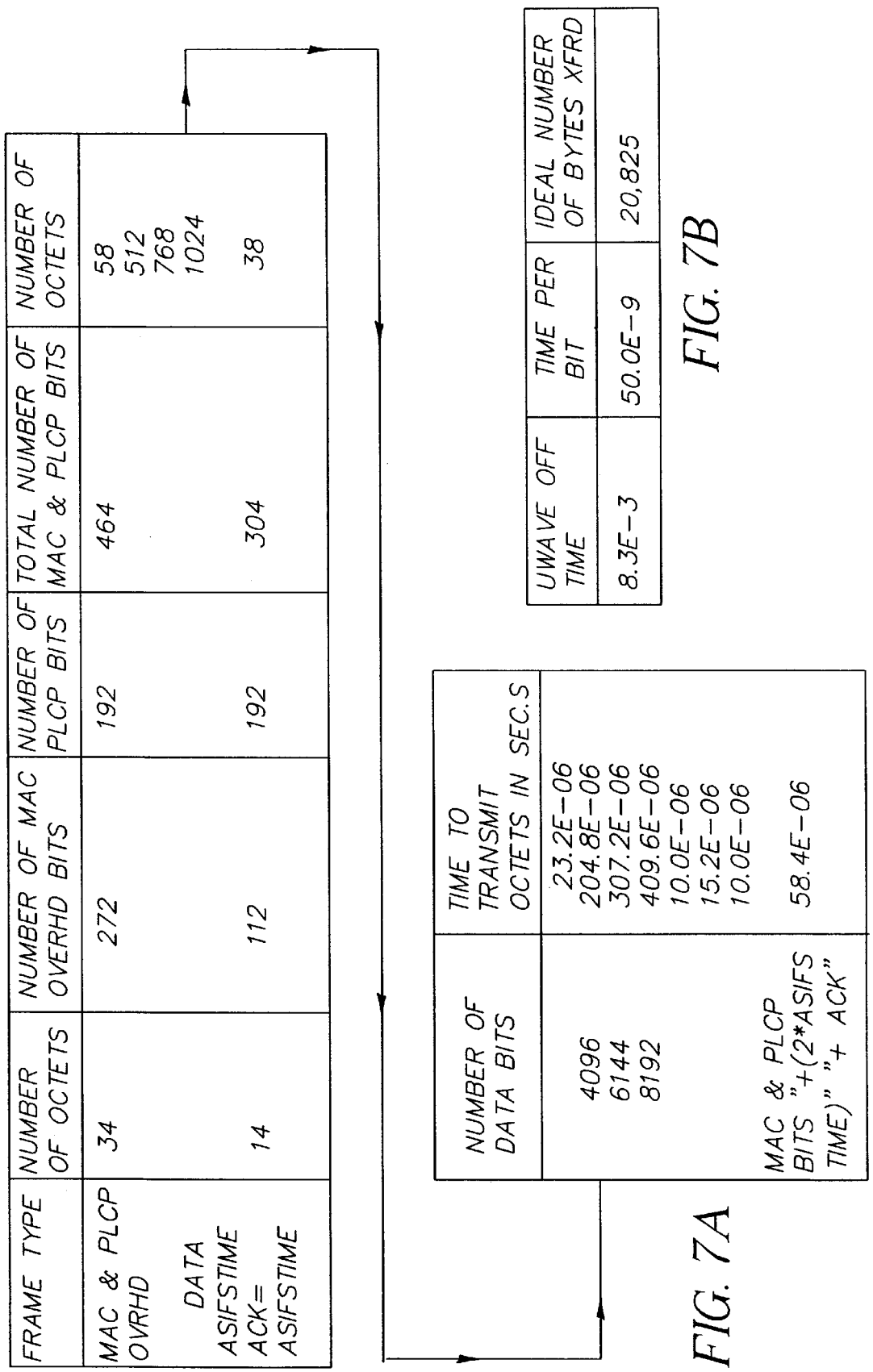
FIG. 7 is a series of calculations showing an improvement in the communications throughput.
Figure 7C:
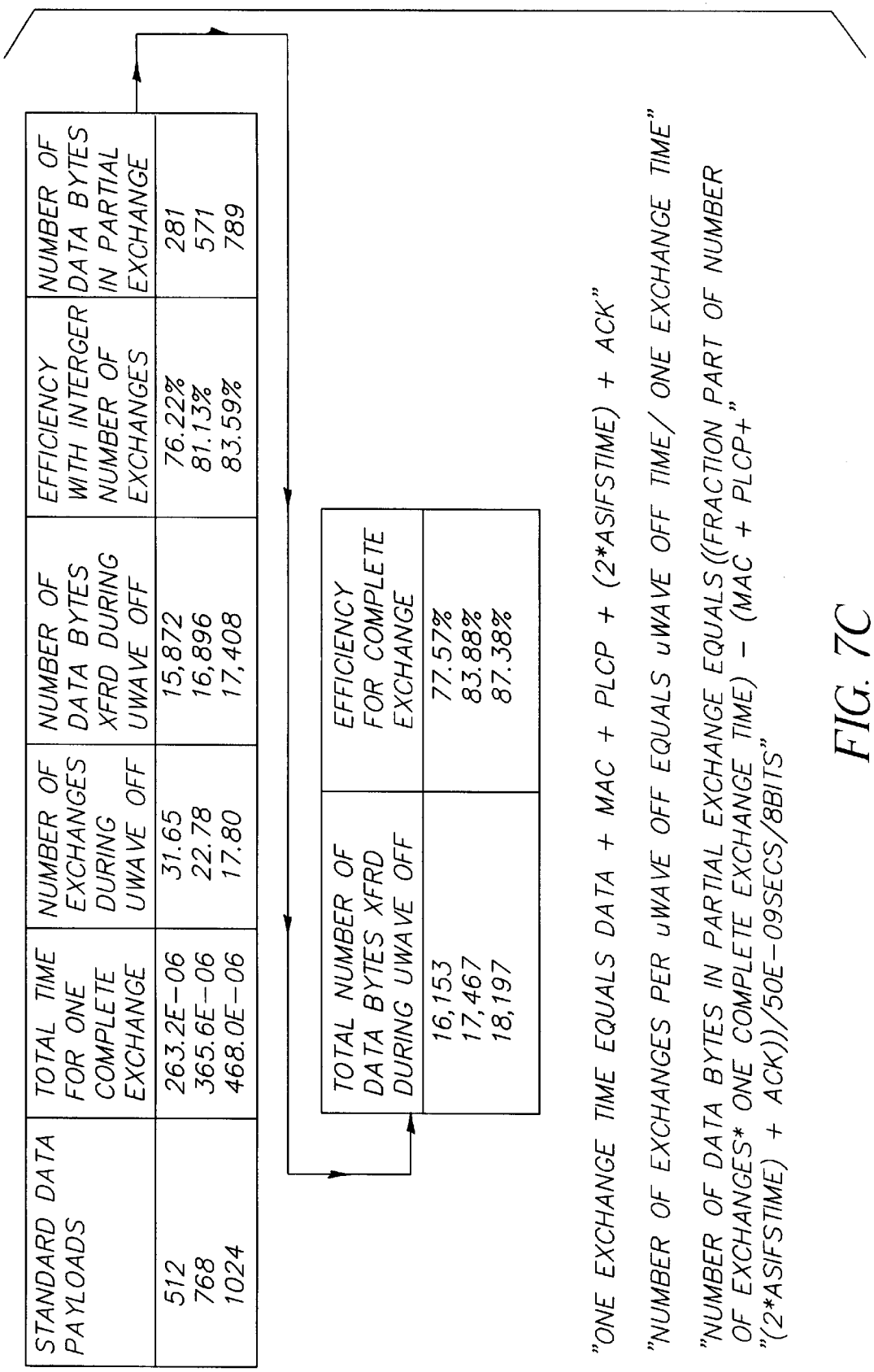

In FIG. 5, a $19^{th}$ data packet 32 has been transmitted with enough data to fill the unused portion of the quiescent period. This is often more effective than spreading the additional data over all the other data packets, or making the last data packet larger. This algorithm also is easier to implement in case something changes before the unused space at the end of the quiescent period 30. The system used the length of the quiescent period and the time $t_n$ data to calculate and fill this $19^{th}$ data packet by the algorithm shown logically in FIG. 6. The process shown in FIG. 6 starts with the reception of a Start of Quiescent Period (QP) packet. It is decoded and the period duration, QP is extracted. The QP end time is the duration sent by the packet minus the time elapsed since receiving the packet, or $T_{now}$. The duration of a packet exchange sequence 24, is calculated and then divided into the QP end time to determine how many integer packets can fit into the unused space at end of quiescent period 30. If the amount of time is enough to justify a packet, a packet is filled with enough data to fill the unused space at end of quiescent period and transmitted. If there is insufficient time left, the algorithm waits and looks for the next start of quiescent period signal, or waits for the internal quiescent period detector to initiate the next transmission sequence.

The invention has been described in detail with particular reference to certain preferred embodiments thereof, but it will be understood that variations and modifications can be effected within the spirit and scope of the invention.

PARTS LIST 10 microwave oven noise energy wave form
12 quiescent (off) period
14 Data packet Header
16 Data payload of Data packet
18 Frame Check Sequence
20 Short Inter-frame Delay
22 Acknowledgment Data packet
24 Data Exchange Sequence
26 Start Of Quiescent Period (SOQP) data packet
28 Data packet
30 Unused space at end of Quiescent period
32 Special variable width data packet
34 Packet start bits
36 Packet type bits
38 Header check sum
40 Duration bits
42 Length bits

What is claimed is:

1. A wireless communication system operating in the presence of the periodic microwave signals such as from a microwave oven, the communication system, comprising:

a) the wireless communication system including at least two wireless communication stations with transceiver in microwave communication with each other, each such station including:

i) means for detecting periodic microwave signals for producing a signal indicating the duration of a periodic microwave signal's quiescent period;

ii) means for controlling the transmitter to send an data packet which includes data and the duration of quiescent periods in the periodic microwave signal; and iii) means for adjusting the amount of data sent in an data packet as a function of the duration of the quiescent period.

2. The wireless communications system as set forth in claim 1 wherein the data packet includes the type of data packet, and quiescent duration time.

3. The wireless communications system as set forth in claim 1 wherein a plurality of data packets are transmitted and the last transmitted data packet is adjusted for the amount of data to make efficient use of the remaining quiescent period.

* * * * *